Dec. 18, 1934.  E. S. BECKER  1,984,961
FASTENER
Filed July 30, 1932

Inventor
Earl S. Becker

By Clarence A. O'Brien
Attorney

Patented Dec. 18, 1934

1,984,961

UNITED STATES PATENT OFFICE 1,984,961

FASTENER

Earl Stewart Becker, Schenectady, N. Y.

Application July 30, 1932, Serial No. 627,045

3 Claims. (Cl. 24—131)

My invention relates to fasteners, and particularly to fasteners for lines such as clothes lines, cords, ropes, and the like, and an important object of my invention is to provide a device of this kind which is not only very easily constructed at low cost, but which is very efficient and can be engaged by the line with a very simple manipulation of the line with respect thereto and which exerts a stronger grip on the line the greater the pull on the line.

Other objects and advantages of my invention will be apparent from a reading of the following description in connection with the drawing, wherein for purposes of illustration I have shown a preferred embodiment of the invention.

In the drawing:—

Figure 1:
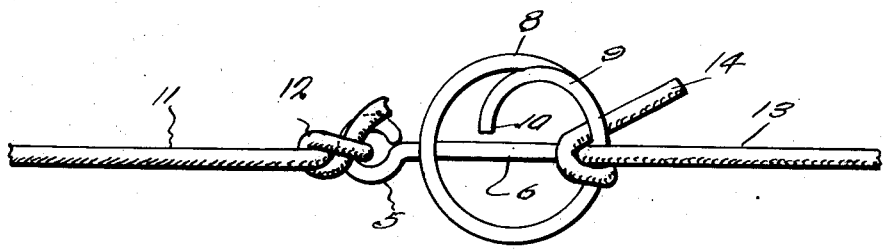
Figure 1 is a top plan view of the embodiment showing a line applied thereto.
Figure 2:
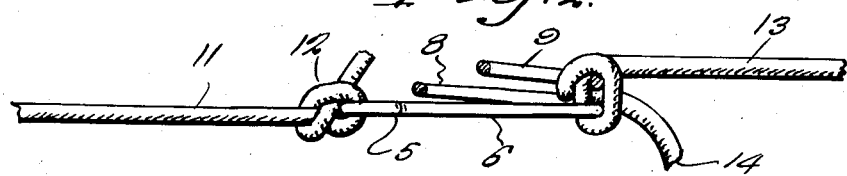
Figure 2 is a transverse sectional view taken longitudinally through Figure 1 showing the relationship of the convolutions of the embodiment.
Figure 3:
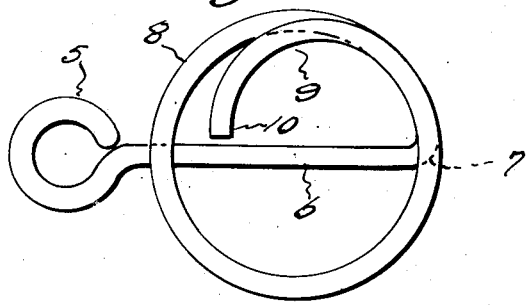
Figure 3 is an enlarged top plan view of the embodiment.
Figure 4:
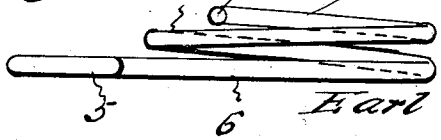
Figure 4 is a side elevational view of Figure 3.

Referring in detail to the drawing, wherein like numerals refer to like parts throughout the same, the device of the invention comprises a single length of suitable spring bar or wire which is bent at one end into a closed eye or loop 5 which extends into a straight shank 6 which terminates in a sharp rearward bend at the point indicated by the numeral 7 and is turned into a spiral 8 of about one and one half convolutions. The half-convolution 9 has its terminal end portion 10 located above the shank 6 and within the perimeter of the full convolution 8. It will be observed that the end of the convolution 9 indicated at 10 terminates at a point near a point directly above the shank 6. The main convolution or spiral 8 extends equally from two opposite sides of the shank 6, and the axis of the spiral 8 is substantially parallel to the axis of the eye 5.

The end of the line indicated at 11 is attached by any knot 12 to the eye 5, while the end of the line 13 is passed through the half convolution 9 and through the spiral 8 and returned around the outside of both of the convolutions of the spiral and returned through the spiral and passed into a positon between the convolutions 9 and 8, as shown in the drawing. It will be obvious that when a pull is exerted upon the end 13 of the line that the convolutions 8 and 9 will be drawn closer together and the loose end of the line therebetween disposed will be gripped with a correspondingly greater force so that the end 13 of the line is securely held. It wil be obvious that all that is necessary to separate the end of the line 13 from the device of the invention is to pull the loose end 14 toward the opposite side of the spiral thereby pulling the loose end 14 from between the convolutions whereupon the line 13 may be drawn through the convolutions transversely and in this manner separated from the device.

Though I have shown and described herein a preferred embodiment of the invention, it is to be definitely understood that I do not desire to limit the application of the invention thereto, and any change or changes may be made in material and structure and arrangement of parts, within the spirit of the invention and the scope of the subjoined claims.

What is claimed is:—

1. A device of the type described consisting of a length of wire forming a straight shank, one end of the shank being bent into an eye, the opposite end of the shank being sharply return bent toward the eye and curved to form a helical coil located at one side of and along the shank and projecting substantially equally from opposite sides of the shank.

2. A fastener of the type described comprising a length of wire formed to provide a straight shank carrying an eye at one end, the opposite end of said shank being laterally and curvedly directed into a helical coil of at least one convolution, said coil having on its terminal end as a continuation thereof a modified spiral convolution whose terminal end portion is curved radially inwardly toward and to a point adjacent to said shank said helical coil being arranged to lie along said shank and extend beyond two opposite sides of said shank for substantially equal distances.

3. A fastener comprising a length of wire forming a straight shank bent at one end to provide an eye and bent at the opposite end to form a helical coil extending alongside of the shank toward the eye and projecting substantially equally on opposite sides of the shank, said helical coil being composed of at least one full spiral convolution, the terminal end of the half spiral convolution being deflected radially inwardly, in a uniformly curved manner.

EARL STEWART BECKER.